United States Patent
Ferrigno et al.

(10) Patent No.: US 7,294,060 B2
(45) Date of Patent: Nov. 13, 2007

(54) INTERACTIVE DEVICE

(75) Inventors: Al Ferrigno, Floral Park, NY (US); Dan Muldoon, New York, NY (US)

(73) Assignee: Mattel, Inc., El Segundo, CA (US)

( * ) Notice: Subject to any disclaimer, the term of this patent is extended or adjusted under 35 U.S.C. 154(b) by 898 days.

(21) Appl. No.: 10/654,271

(22) Filed: Sep. 3, 2003

(65) Prior Publication Data

US 2005/0048457 A1 Mar. 3, 2005

(51) Int. Cl.
*A63F 9/24* (2006.01)

(52) U.S. Cl. .................. 463/43; 434/317; 434/402; 434/426; 446/149; 446/408

(58) Field of Classification Search ............. None
See application file for complete search history.

(56) References Cited

U.S. PATENT DOCUMENTS

| | | | |
|---|---|---|---|
| 3,078,593 A | 2/1963 | Miller | |
| 3,408,749 A | 11/1968 | Brudner | |
| 3,609,878 A | 10/1971 | Bender | |
| 3,704,337 A | 11/1972 | Sims, Jr. et al. | |
| 3,735,500 A | 5/1973 | Matsumoto | |
| 4,552,535 A | 11/1985 | Steffel | |
| 4,555,859 A * | 12/1985 | Corso | 40/457 |
| 4,573,928 A | 3/1986 | Seki | |
| 4,778,391 A * | 10/1988 | Weiner | 434/317 |
| 4,976,429 A * | 12/1990 | Nagel | 463/34 |
| 4,997,374 A | 3/1991 | Simone | |
| 5,312,284 A * | 5/1994 | Grober et al. | 446/143 |
| 5,466,158 A | 11/1995 | Smith, III | |
| 5,474,457 A * | 12/1995 | Bromley | 434/311 |
| 5,574,519 A | 11/1996 | Manico et al. | |
| 5,611,694 A | 3/1997 | Bromley | |
| 5,651,681 A | 7/1997 | Chan | |
| 5,695,345 A * | 12/1997 | Weiner et al. | 434/317 |
| 5,813,861 A | 9/1998 | Wood | |
| 5,851,119 A | 12/1998 | Sharpe, III et al. | |
| 5,944,574 A * | 8/1999 | Small et al. | 446/149 |
| 6,064,855 A | 5/2000 | Ho | |
| 6,328,570 B1 | 12/2001 | Ng | |
| 6,377,780 B2 | 4/2002 | Greenberg | |
| 6,608,618 B2 | 8/2003 | Wood et al. | |

\* cited by examiner

*Primary Examiner*—M. A. Sager
(74) *Attorney, Agent, or Firm*—Akin Gump Strauss Hauer & Feld LLP (57) ABSTRACT

An interactive device includes a base unit and at least one interchangeable cartridge. The base unit comprises a transparent pressure-sensitive touchscreen overlying the cartridge and a microphone. The cartridge comprises a scroll having a plurality of image frames which are sequentially viewable through the transparent touchscreen and a digital memory. The cartridge is configured to key into a cartridge receptacle in the base unit and couple the memory with a processor in the base unit. The cartridge includes release levers which prevent rotation of the scroll when the cartridge is removed from the base unit.

32 Claims, 10 Drawing Sheets

INTERACTIVE DEVICE

BACKGROUND OF THE INVENTION

The present invention relates to the field of interactive electronic devices. More particularly, the present invention relates to interactive toys that receive a plurality of interchangeable cartridges, each cartridge having a scroll displaying in succession a plurality of pictorial scenes.

It is known in the art to provide an electronic device adapted to receive a plurality of interchangeable cartridges, each cartridge having a substrate mounted on rods in the manner of a scroll, the substrate having a plurality of pictorial scenes disposed thereon. Such devices are described in U.S. Pat. No. 5,474,457 (Bromley); U.S. Pat. No. 5,695,345 (Weiner et al., hereinafter "Weiner"); and U.S. Pat. No. 5,944,574 (Small et al., hereinafter "Small"). More particularly, Bromley discloses an interactive device having a story belt disposed within a cartridge. When the cartridge is inserted into the device of Bromley, the story belt overlies a membrane key pad having a plurality of electrical switches. A user of the device of Bromley may press on the story belt to activate one of the plurality of electrical switches to initiate a response from the device. Weiner discloses a base unit along with a plurality of cartridges having a window, a pair of rods rotatably mounted in the housing, and a printed substrate mounted on the rods in the manner of a scroll. The cartridges of Weiner are disclosed to preferably include a memory unit which is operatively connected to a microcontroller housed in the base unit. Small discloses an interchangeable cassette which is received in a base unit. The cassette includes a pair of rollers on which a picture scroll is wound. Small further discloses a plurality of interactive control buttons disposed in the base unit adjacent the cavity into which the cassette is received.

An interactive toy which provides an input device, not previously incorporated into such toys, through which a user may interact with the toy should provide more engaging play activity than previous interactive toys. Further, an interactive toy having an interchangeable cartridge incorporating features to improve the durability of the cartridge would also be desirable.

BRIEF SUMMARY OF THE INVENTION

Briefly, the invention is a base unit of an interactive device configured for use with a cartridge. The cartridge includes: a cartridge housing; a scroll in the cartridge housing having a first side and a second side, a first end and a second end, and a plurality of image frames disposed on the first side; a first window in the cartridge housing disposed adjacent the first side of the scroll; a first roller rotatably supported within the cartridge housing and connected to the scroll first end; and a second roller rotatably supported within the cartridge housing and connected to the scroll second end. The base unit comprises: a base unit housing; a cartridge receptacle in the base unit housing adapted to releaseably receive the cartridge; a controller; and at least one drive motor operatively connected to the controller and positioned to be operatively coupled with at least one of the first roller and the second roller of the cartridge with the cartridge inserted into the receptacle. The base unit further comprises: at least one scroll index control button operatively coupled with the controller to control operation of the drive motor, a window opening through the base unit housing into the receptacle, the window opening being located so as to be in at least general overlying alignment with the first window of the cartridge inserted in the cartridge receptacle; and a transparent touchscreen operatively coupled to the controller and positioned in the base unit window opening so as to be in at least general overlying alignment with the first window and the scroll so that the image frames are displayed and visable through both the first cartridge window and the touchscreen.

In a second aspect, the invention is a base unit of an interactive device configured for use with a cartridge. The cartridge includes: a cartridge housing; a scroll in the cartridge housing having a first side and a second side, a first end and a second end, and a plurality of image frames disposed on the first side; a first window in the cartridge housing disposed adjacent the first side of the scroll; a first roller rotatably supported within the cartridge housing and connected to the scroll first end; and a second roller rotatably supported within the cartridge housing and connected to the scroll second end. The base unit comprises: a base unit housing; a cartridge receptacle in the base unit housing adapted to releaseably receive the cartridge; a controller; at least one drive motor operatively connected to the controller and positioned to be operatively coupled with at least one of the first roller and the second roller of the cartridge with the cartridge inserted into the receptacle; a first rotary member operably coupled with the drive motor and having a first set of teeth that engage teeth of a second rotary member, allowing the first rotary member to drive the second rotary member at least when the first rotary member is rotated in a first direction, and a second set of teeth that engage teeth of a third rotary member, allowing the first rotary member to drive the third rotary member at least when the first rotary member is rotated in a second direction, wherein the second rotary member is operably coupled to the first roller and the third rotary member is operably coupled to the second roller. At least one scroll index control button is operatively coupled with the controller to control operation of the drive motor. A window opening through the base unit housing into the receptacle is located so that the window opening is in at least general overlying alignment with the first window and the image frames of the cartridge inserted in the cartridge receptacle so that the image frames are displayed and visible through both the first cartridge window and the base unit window opening. A touch responsive array is operatively coupled to the controller and positioned in at least general overlying alignment with the base unit window opening and the first window of the cartridge inserted into the cartridge receptacle.

In a third aspect, the invention is an interchangeable cartridge for use with a base unit of an interactive toy. The cartridge comprises: a cartridge housing; at least a first transparent member forming a first window in the cartridge housing; a scroll in the cartridge housing with first and second ends and having first and second sides, the first side having a plurality of image frames disposed thereon, the frames being visible through the first transparent member; a first roller rotatably supported within a first portion of the cartridge housing, connected to the scroll first end, and having a first central longitudinal axis; a second roller rotatably supported within a second portion of the cartridge housing, connected to the scroll second end, and having a second central longitudinal axis. The cartridge further comprises a third portion of the cartridge housing located between the first and second portions; a recess containing an aperture into the cartridge housing formed in a fourth portion of the cartridge housing, the recess and the fourth portion being adjacent to the third portion of the cartridge housing and between the first and second portions. Each of the first through fourth portions of the cartridge housing has a respective, associated thickness, with first and second thicknesses respectively associated with the first and second portions of the housing being approximately equal, a third thickness associated with the third portion of the housing being less than the first and second thicknesses, and a fourth thickness associated with the fourth portion of the housing being less than the third thickness, the thicknesses being in a direction perpendicular to a plane defined by the first transparent member. The first through fourth thicknesses are sized to allow the cartridge to be releasably keyed into a cartridge receptacle of the base unit of the interactive toy.

BRIEF DESCRIPTION OF THE SEVERAL VIEWS OF THE DRAWINGS

The following detailed description of a preferred embodiment of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right", "left", "top", and "bottom" designate directions in the drawings to which reference is made. The words "interior" and "exterior" refer to directions toward and away from, respectively, the geometric center of the interactive device assembly and designated parts thereof. The terminology includes the words above specifically mentioned, derivatives thereof and words of similar import.

Figure 1:
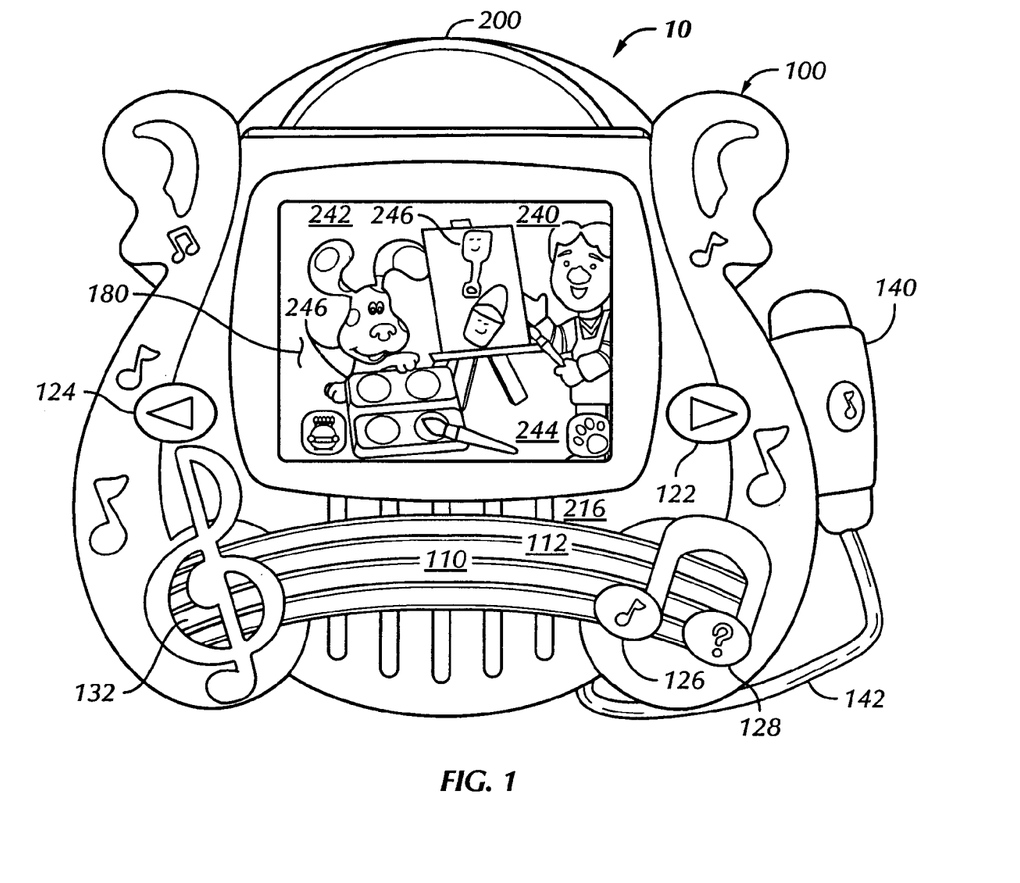
FIG. 1 is a front view of an interactive device assembly in accordance with a preferred embodiment of the present invention, showing an interchangeable cartridge inserted within a base unit.
Figure 2:
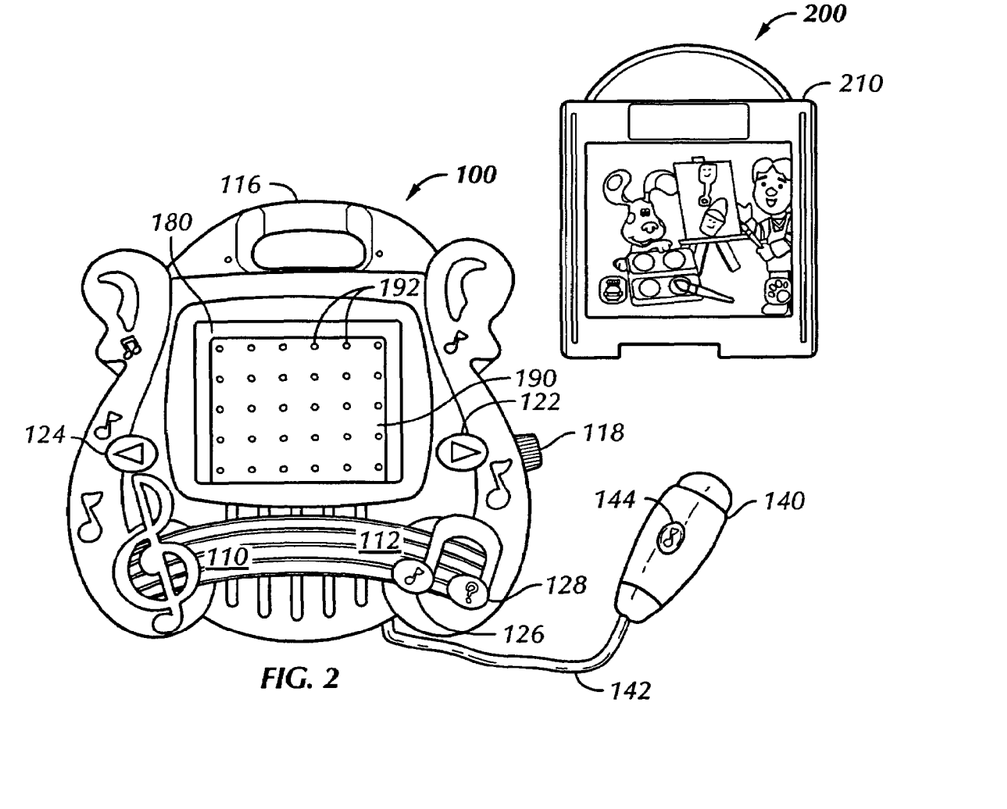
FIG. 2 is a front view of the interactive device assembly of FIG. 1, with the interchangeable cartridge removed from the base unit and a microphone detached from the base unit.
Figure 3:
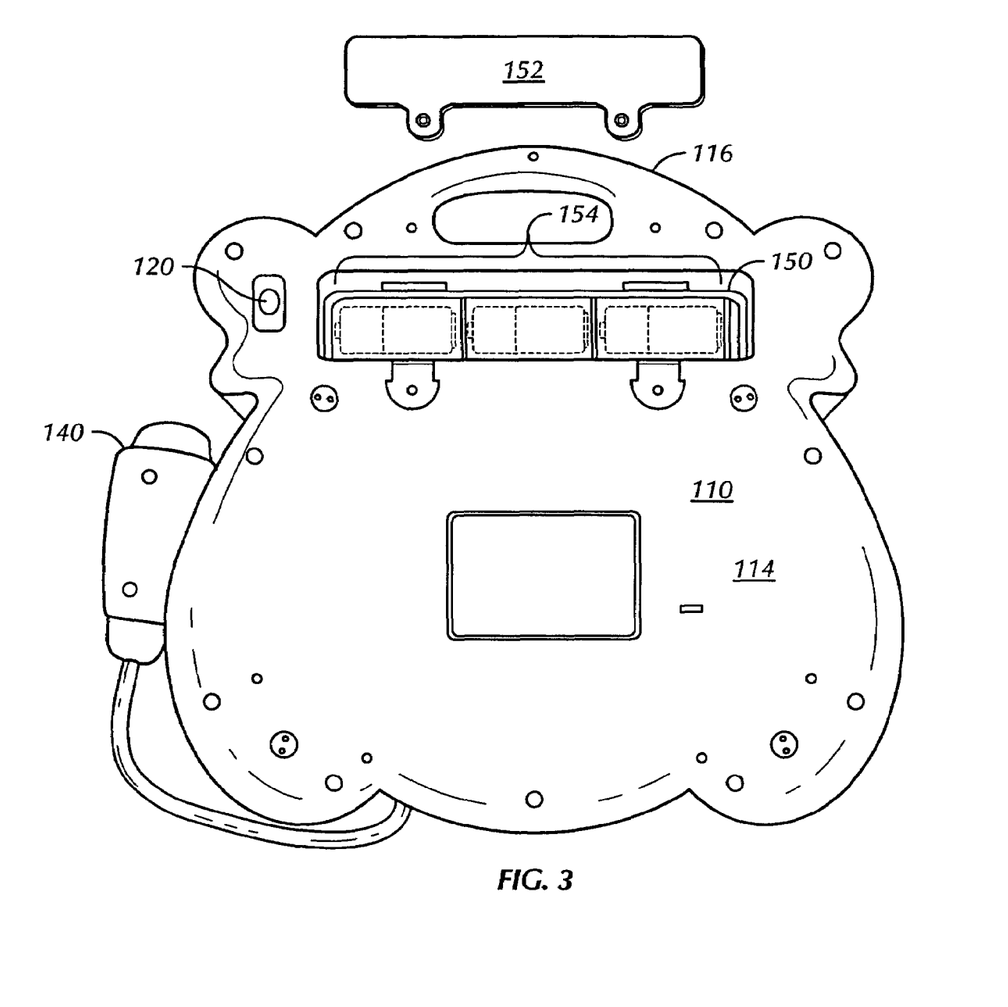
FIG. 3 a rear view of the interactive device of FIG. 1, with a battery box door removed to expose batteries within the battery box.

Referring to the drawings, wherein like referenced numerals are used to designate the same components throughout the figures, there is shown in FIGS. 1-12 in accordance with currently preferred embodiments of the present invention, an interactive device which is particularly well-suited for use as an interactive toy assembly 10. With particular reference to FIGS. 1-3, the interactive toy assembly 10 is shown to comprise a base unit 100 and an interchangeable cartridge 200, having a cartridge housing 210, removably inserted within the base unit 100. The base unit 100 is shown to include a housing 110 having a front face 112 and a rear face 114. A handle 116 is provided proximate a top of the base unit housing 110. A speaker grill 132 covers a speaker 130 (see FIG. 12).

The base unit 100 further comprises a window opening through the base unit housing 110, into which a transparent pressure-sensitive input device or touchscreen 180 is positioned, in the front face 112. An array of lights 190, formed by a plurality of individual lights 192, is disposed within an interior cavity formed within the base unit housing 110 to releaseably receive the cartridge, or cartridge receptacle 160 (see also FIG. 5). The lights 192 are preferably light emitting diodes (LED's). When the cartridge 200 is inserted within the cartridge receptacle 160, it is interposed between the array of lights 190 and the touchscreen 180, as is seen in a comparison of FIGS. 1 and 2. The window opening is in at least general overlying alignment with a first window 220 (FIG. 6, discussed herein below) of the cartridge 200 inserted in the cartridge receptacle 160.

The touchscreen 180 is preferably of a conventional mechanical contact type with a grid of spaced vertical and horizontal contact line electrodes laid down in transparent conductive ink on facing sides of a rigid, transparent plastic plate and a flexible plastic sheet overlying the plate which are biased apart by an array of transparent resilient, preferably elastomeric dots located between the line electrodes. Pressing against the flexible plastic sheet over a cross point of the grid where a horizontal and vertical contact electrode cross one another, closes a circuit formed through the two electrodes and identifies the touched location. The grid might be four or more line electrodes in either direction (horizontal or vertical) depending upon the size of the touchscreen and the resolution desired. For example, a five by six grid is used in a four inch by five inch touchscreen in the present example and overlies a five by six array of lights 190 so that each light 192 preferably underlies a separate one of the line electrode crossovers. The artisan will recognize that any type of touchscreen, for example of the capacitive, infrared, or resistive type, which can be fabricated to be transparent, could be substituted.

The base unit 100 further includes a microphone 140. As seen particularly in FIG. 2, the microphone 140 is releasably mounted to the base unit housing 110 by a microphone mount 118 which releaseably fits into a mating receptacle disposed in the microphone 140. The microphone 140 is connected to the base unit housing 110 by a microphone cord 142. The microphone 140 includes an activation button 144.

The base unit 100 still further includes a number of control buttons. As shown in FIGS. 1 and 2, control buttons disposed on the front face 112 include a scroll advance button 122 and a scroll rewind button 124. Additional control buttons include a first functional button 126 and a second functional button 128. Operation of each of these control buttons will be discussed in detail later herein. FIG. 3 illustrates an on/off button 120 disposed on the rear face 114.

FIG. 3 further illustrates that a battery box 150 is accessible from the rear face 114 when a battery box door 152 is removed from the base unit housing 110. A plurality of dry cell batteries 154 are contained within the battery box 150 to provide electrical power to the interactive toy 10. From this disclosure, the artisan will recognize that other types of electrical power sources, for example a conventional rechargeable battery pack, solar cells, or capacitive power supplies, could be substituted for the dry cell batteries 154, as could be AC line power fed through a transformer.

Figure 4:
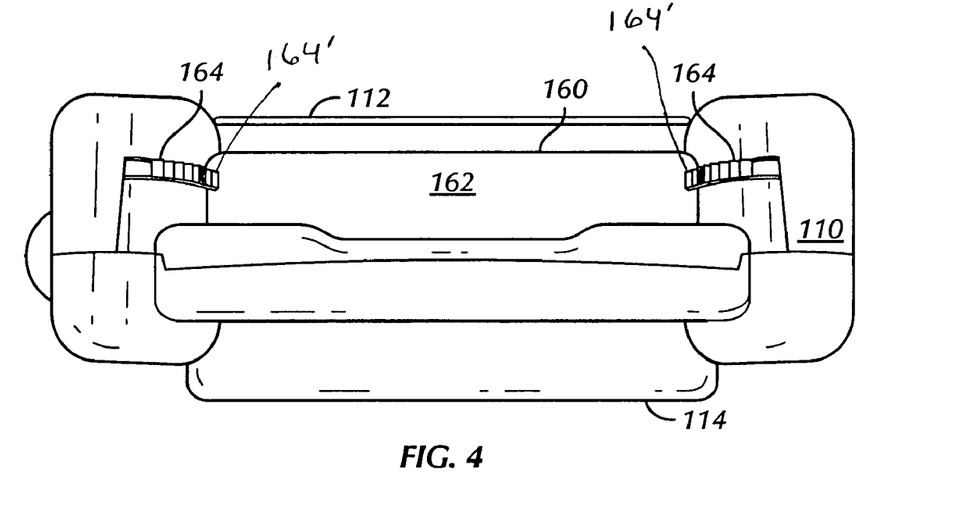
FIG. 4 a top view of the base unit of FIG. 2.

With particular reference now to FIG. 4, the base unit 100 includes the cartridge receptacle 160 into which the cartridge 200 is releasably received. The receptacle 160 has width, height and depth dimensions corresponding generally to the dimensions of the cartridge 200. An opening of the receptacle 160 is covered by a spring-biased receptacle door 162. A pair of cartridge retainers are disposed adjacent sides of the receptacle 160. The cartridge retainers include an upper pivoting lever 164 and a lower translating member 164'. As the upper pivoting lever 164 pivots, it alternatively moves the translating member 164' away from and toward the opening of the cartridge receptacle 160. The upper levers 164 are spring-biased such that the translating members 164' are nominally positioned toward the opening of the cartridge receptacle 160. The translating members 164' include a cammed surface which allows the translating members 164' to be pushed away from the receptacle opening when the cartridge 200 is being inserted into the receptacle 160. When the cartridge 200 is inserted into the receptacle 160, the translating members 164' return to the nominal spring-biased position under the action of the upper levers 164, and engage with a pair of locking receptacles formed in an upper portion of side edges of the cartridge housing 210, thus locking the cartridge 200 to the base unit 100.

Figure 5:
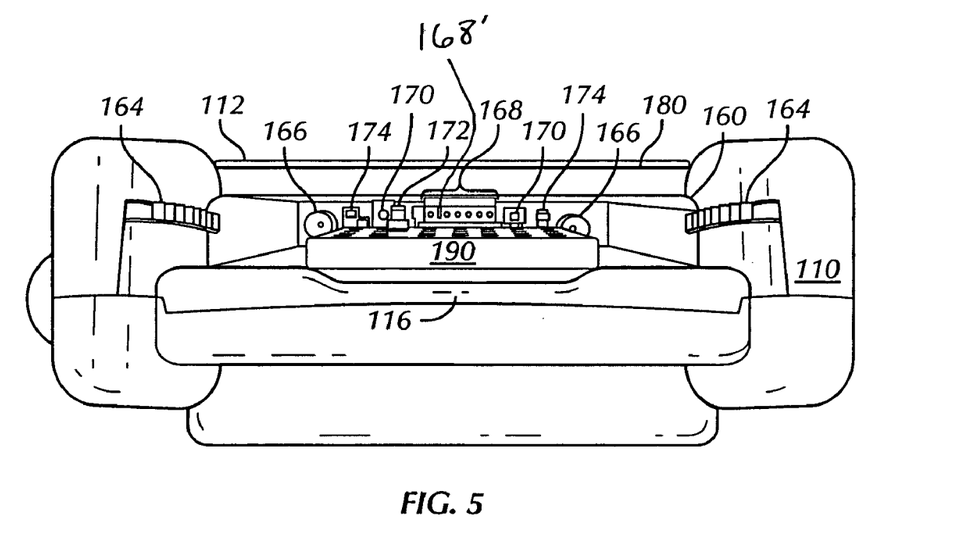
FIG. 5 is a top view of the interactive device of FIG. 4, with a cartridge receptacle door opened to reveal components disposed within a cartridge receptacle.

With reference now to FIG. 5, the receptacle door 162 is pivoted open to reveal an interior of the cartridge receptacle 160. The light array 190 is seen to be disposed along an interior wall of the cartridge receptacle 160. A number of components are provided along a bottom wall of the cartridge receptacle 160. Specifically, a pair of cartridge drive members 166, preferably sockets as shown, which insert into the base of the cartridge 200 and engage and rotate first and second scroll rollers 260, 270, described later herein, are proximate opposing ends of the bottom wall, respectively. The drive sockets 166 are driven for rotation in clockwise and counterclockwise directions by a drive assembly including a drive motor 300 and drive train shown in FIG. 11 and discussed in detail below.

The cartridge receptacle 160 further includes a pair of scroll release lever engagement pins 174. The release lever engagement pins 174 are rigidly attached to a remainder of the base unit housing 110, and extend upwardly from the bottom wall of the cartridge receptacle 160 such that the pins 174 engage with a bottom edge of the cartridge housing 210 when the cartridge 200 is inserted into the base unit 100. More particularly, as described later herein, the pins 174 engage a pair of scroll release levers 266 when the cartridge 200 is inserted.

The cartridge receptacle 160 still further includes a pair of biasing members. The biasing members are preferably spring-loaded pins 170 projecting upwardly from the bottom wall. The spring-loaded pins 170 engage the bottom edge of the cartridge housing 210 when the cartridge 200 is inserted into the base unit 100. Thus, when the cartridge retainers 164 are moved out of engagement with the locking receptacles proximate the top portion of the cartridge 200, the spring-loaded pins 170 push the cartridge 200 upwardly, such that the locking receptacles are moved out of a position where the locking receptacles can be engaged by the cartridge retainers 164.

A plurality electrical contacts in the form of spring-loaded electrical contact pins 168 are provided within the cartridge receptacle 160. The contact pins 168 engage a corresponding plurality of circuit board contacts 282 located on a circuit board 280 housed within the cartridge 200. The circuit board 280, circuit board contacts 282 and operation of these elements with the contact pins 168 is described later herein. Preferably a protruding alignment or key member 168' projects rigidly upwardly between the two left-most (as seen in FIG. 5) contacts 168.

A final element contained within the cartridge receptacle 160 is an optical sensor 172. The optical sensor 172 is mounted to the interior wall and is spring-biased in a position projecting forwardly into the cartridge receptacle 160 from the interior wall. When the cartridge 200 is being inserted into the base unit 100, the optical sensor 172 is pushed rearwardly toward the interior wall by the cartridge housing 210. When the cartridge 200 is completely inserted and locked into the base unit 100, the optical sensor 172 moves forward from the interior wall into a position proximate to an optical sensor access hole 224, described later herein. Operation of the optical sensor 172 is described later herein.

With reference now to FIGS. 6-10, the cartridge 200 is shown. The cartridge housing 210 is formed by a front shell 212 and a rear shell 214 and has a front face 216 and a rear face 218. A scroll 240 is enclosed within the housing 210. The scroll 240 has a first side 244 having a plurality of image frames 242 disposed thereon. Each image frame 242 comprises various graphic images 246. The scroll 240 further has a second side 248.

Figure 6:
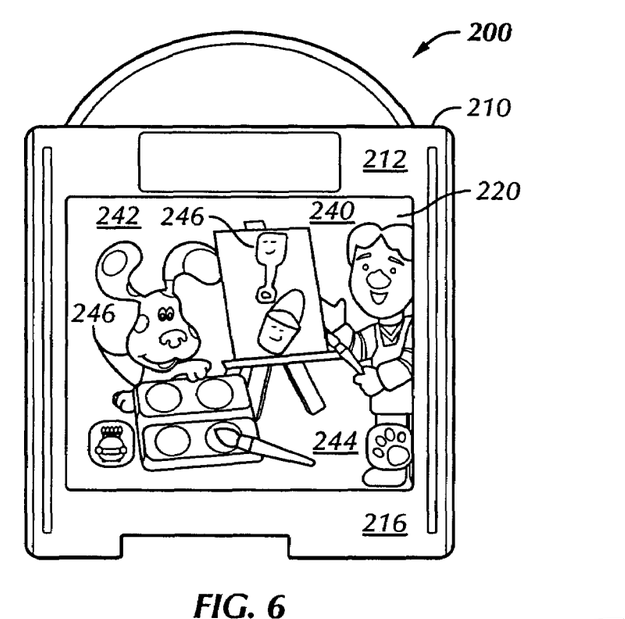
FIG. 6 is a front view of the interchangeable cartridge of FIGS. 1 and 2.

With particular reference now to FIG. 6, a first window 220 is provided in the front face 216, while a second window 222 is provided in the rear face 218. The first side 244 is disposed adjacent the first window 220, such that the image frames 242 are visible through the first window 220. Each image frame 242 has a size generally corresponding to a size of the first window 220.

Figure 7:
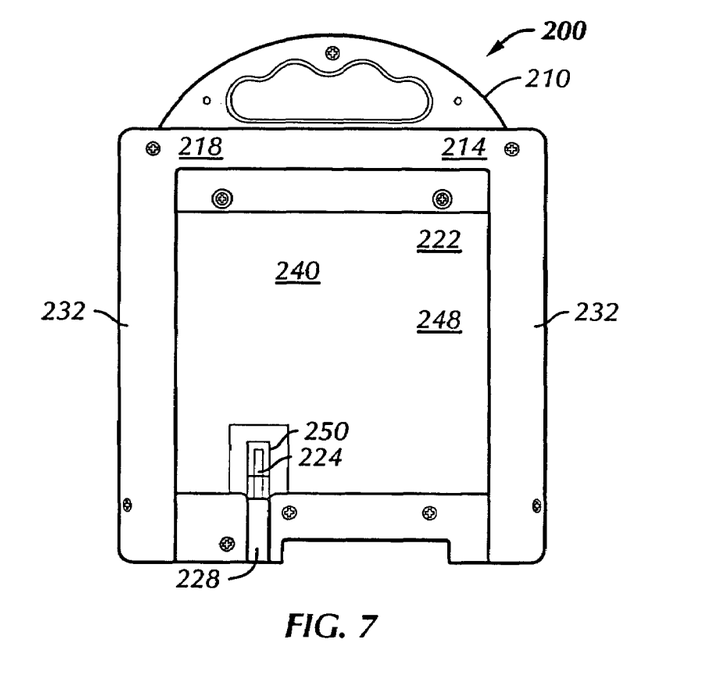
FIG. 7 is a rear view of the interchangeable cartridge of FIG. 6.
Figure 10:
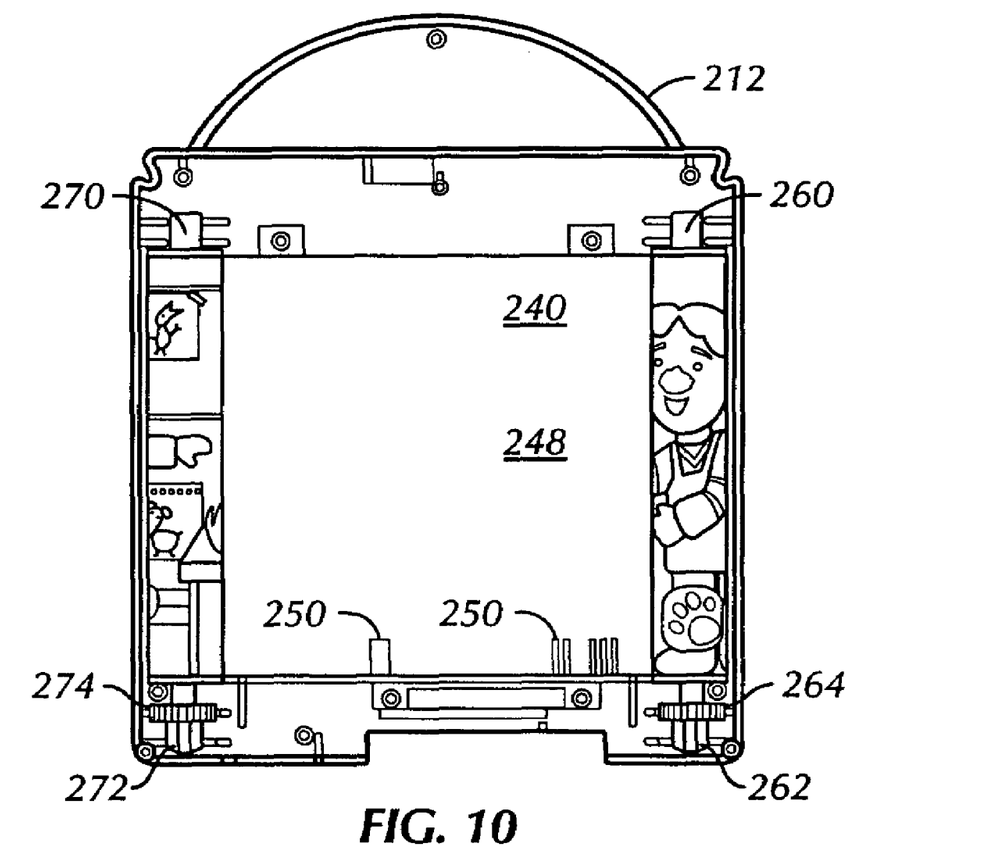
FIG. 10 is a rear view of a front shell portion of the interchangeable cartridge of FIG. 6.

With reference now to FIGS. 7 and 10, the second side 248 is disposed adjacent the second window 222. The second side 248 preferably includes graphic symbols 250. The graphic symbols 250 may be, for example bar codes which serve to uniquely identify each individual image frame 242. Alternatively, the graphic symbols could simply be index markers to facilitate positioning of each frame 242 by the scroll drive assembly, as described later herein. The artisan will recognize that both types of graphic symbols 250 could be provided to perform either or both of the identification and position control functions. The graphic symbols 250 are located on the second side 248 at a position corresponding to the optical sensor access hole 224 and the sensor 172. The optical sensor access hole 224 is a small, preferably rectangular opening in the second window 222. The optical sensor access hole 224 is provided to reduce undesired reflections which would otherwise occur if the second window 222 were continuous. Such reflections would potentially interfere with the proper operation of the optical sensor 172.

With continued reference to FIG. 7, the cartridge housing 210 is shown to further include scroll housing portions 232 along opposing edges of the cartridge housing 210. First and second scroll rollers 260, 270, respectively, described in detail later herein, are housed in first and second scroll housing portions 232. A circuit board 280 with electrical contacts 282, discussed later herein, is housed in a third portion 236 of the housing located between the first and second portions 232. Furthermore, a recessed fourth portion 228 is provided along the bottom edge of the cartridge housing 210 between the first and second portions 232 and adjoining the third portion 236. This recessed portion 228 allows the cartridge 200 to clear and move past the forwardly projecting optical sensor 172 when the cartridge 200 is being inserted and removed from the base unit 100.

Figure 8:
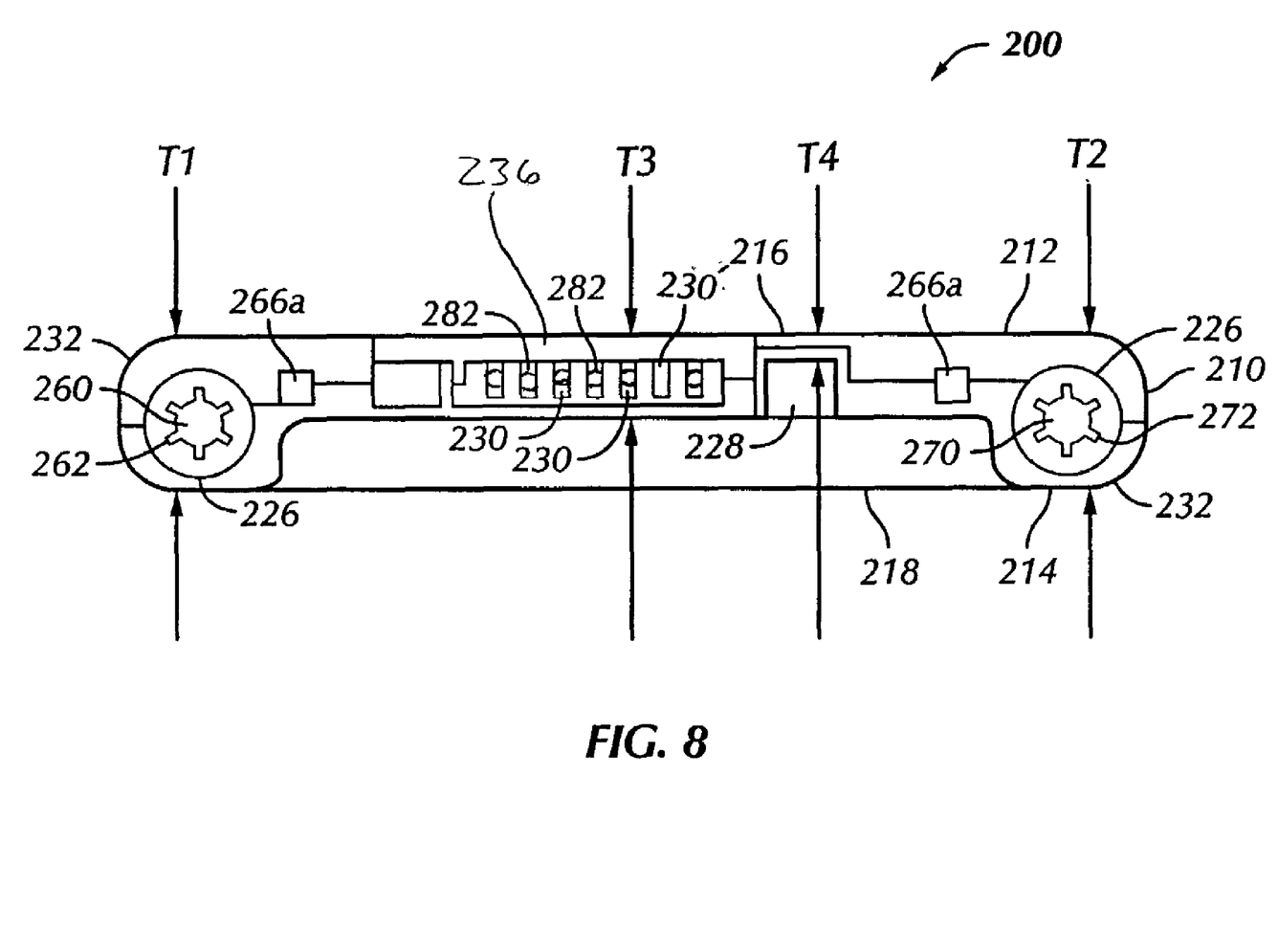
FIG. 8 is a plan view of a bottom edge of the interchangeable cartridge of FIG. 6.

As illustrated in FIG. 8, each of the first through fourth portions of the cartridge housing 210 has a respective, associated thickness. First and second thicknesses T1 and T2, respectively associated with the first and second portions of the housing are approximately equal. A third thickness T3 associated with the third portion of the housing is less than the first and second thicknesses T1 and T2. A fourth thickness T4, associated with the fourth portion of the housing, is less than the third thickness. As indicated in FIG. 8, the thicknesses T1-T4 are measured in a direction perpendicular to a plane defined by the first window 220. The first through fourth thicknesses T1-T4 are sized to allow the cartridge 200 to be releasably keyed into the cartridge receptacle 160 of the base unit 110 of the interactive toy 10.

The scroll 240 is fabricated from a substrate having good durability and the ability to receive a printed image. The substrate is preferably at least translucent. The scroll 240 is preferably fabricated from paper or a polymeric material or paper coated with a polymeric material.

With reference now to FIGS. 8 and 10, the cartridge 200 further comprises the first and second scroll rollers, 260 and 270, respectively. A first end of the scroll 240 is attached to the first scroll roller 260 and a second end of the scroll 240 is attached to the second scroll roller 270. The first and second scroll rollers 260, 270 are supported within the cartridge housing 210 for rotation. The first and second scroll rollers 260, 270 each include a sprocket, 262, 272, respectively, at one end of the scroll rollers 260, 270. The sprockets 262, 272 are recessed within the cartridge housing 210, and accessible through openings 226. The first and second scroll rollers 260, 270 further each include a release gear 264, 274 disposed adjacent the sprockets 262, 272, respectively. Operation of the sprockets 262, 272 and release gears 264, 274 is described later herein.

Figure 9:
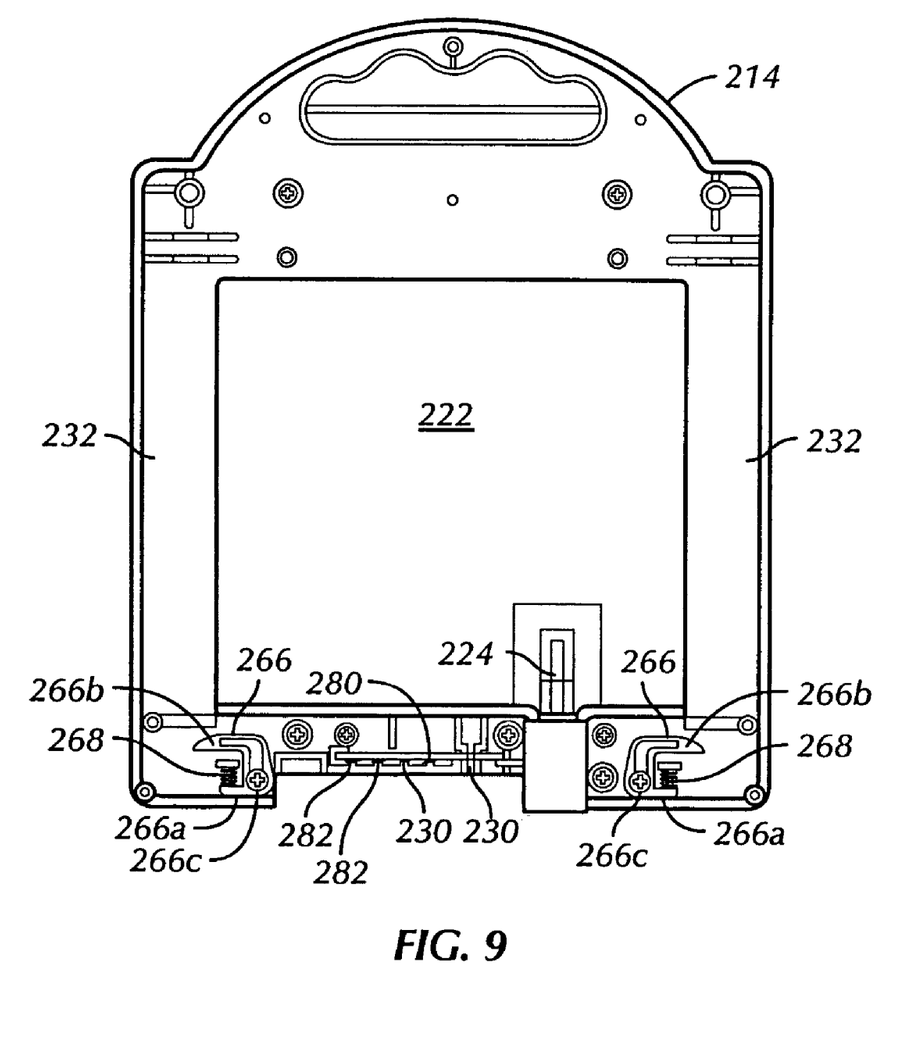
FIG. 9 is a front view of a rear shell portion of the interchangeable cartridge of FIG. 6.
Figure 12:
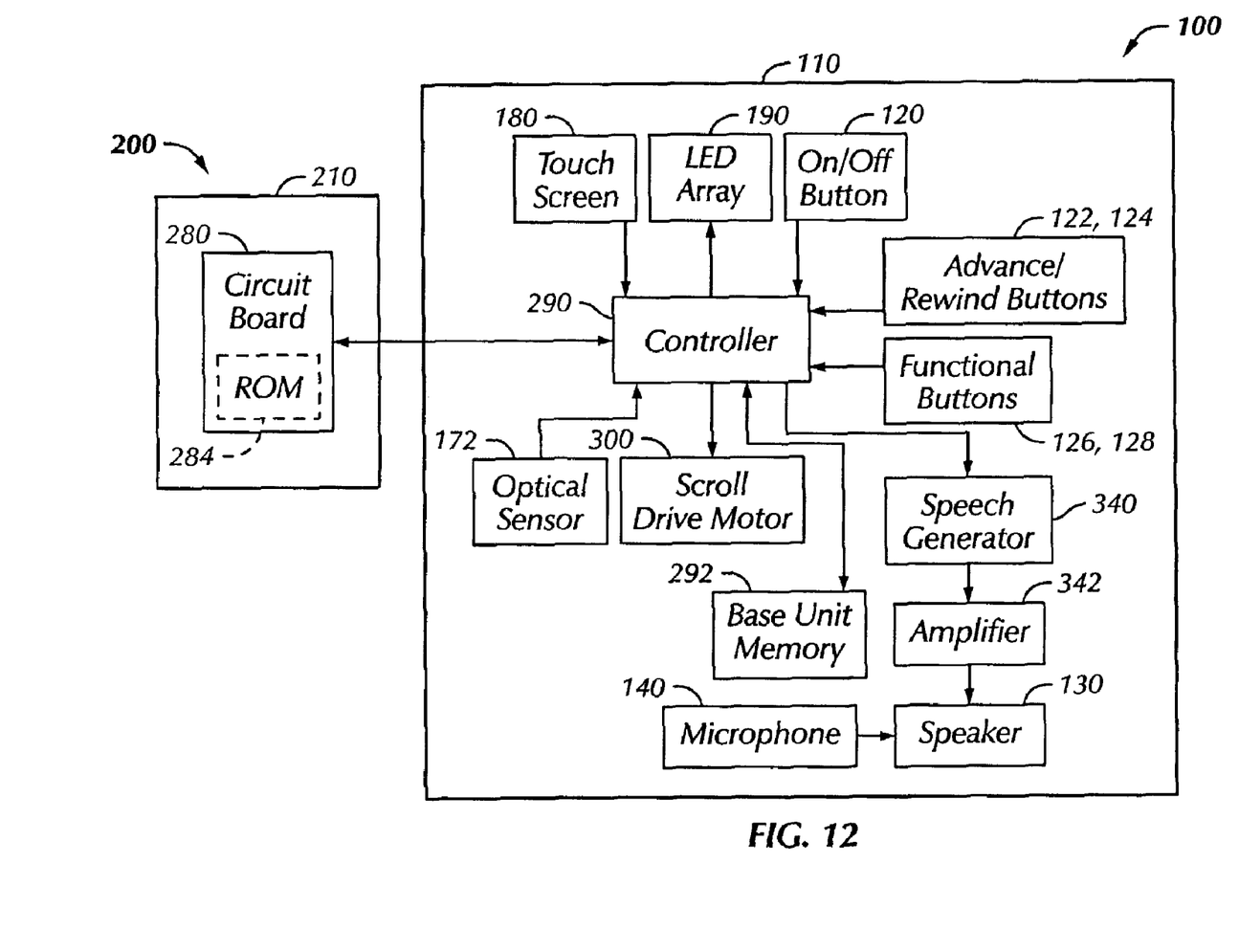
FIG. 12 is a block diagram depicting electrical and electromechanical components of the interactive device assembly of FIG. 1.

With reference to FIGS. 8, 9 and 12, the cartridge 200 further comprises the circuit board 280. Read only memory (ROM) 284 is contained on the circuit board 280. Preferably, the ROM 284 contains information specifically related to each of the image frames 242. The circuit board 280 further includes a plurality of electrical contacts 282, which, when the cartridge 200 is fully inserted into the base unit 100, operatively engage the corresponding plurality of electrical contact pins 168 described above. The circuit board electrical contacts 282 are accessible to the base unit electrical contact pins 168 through a plurality of access holes 230 formed along the bottom edge of the cartridge housing 210. One hole 230' lacks a contact and is configured to receive alignment/key member 168' to enable connection of the cartridge contacts 282 with the base unit contact pins 168.

With reference to FIGS. 8-10, the cartridge 200 still further comprises the pair of scroll release levers 266. As best seen in FIG. 9, each release lever 266 has a first end forming a release lever contact portion 266a and a second end forming a release lever stop pin 266b. The release levers 266 are preferably mounted to the rear shell 214 to each pivot about a pivot point 266c. The release levers 266 are biased in a first position by springs 268. When the cartridge 200 is removed from the base unit 100, the release levers 266 are biased into this first position. In the first position, the stop pins 266b engage with the scroll release gears 264, 274 to prevent rotation of the scroll rollers 260, 270.

When the cartridge 200 is inserted into the base unit 100, the release lever engagement pins 174 engage the release lever contacts 266a, overcoming the springs 268 to move the release levers 266 into a second position. In this second position, the release lever stop pins 266b are rotated out of engagement with the release gears 264, 274, and the scroll rollers 260, 270 are thus allowed to rotate. The cooperation of the release lever engagement pins 174, the release levers 266 and the release gears 264, 274 thus prevents rotation of the scroll rollers 260, 270 when the cartridge 200 is outside the base unit 100, and allows rotation of the scroll rollers 260, 270 when the cartridge 200 is inserted into the base unit 100.

Figure 11:
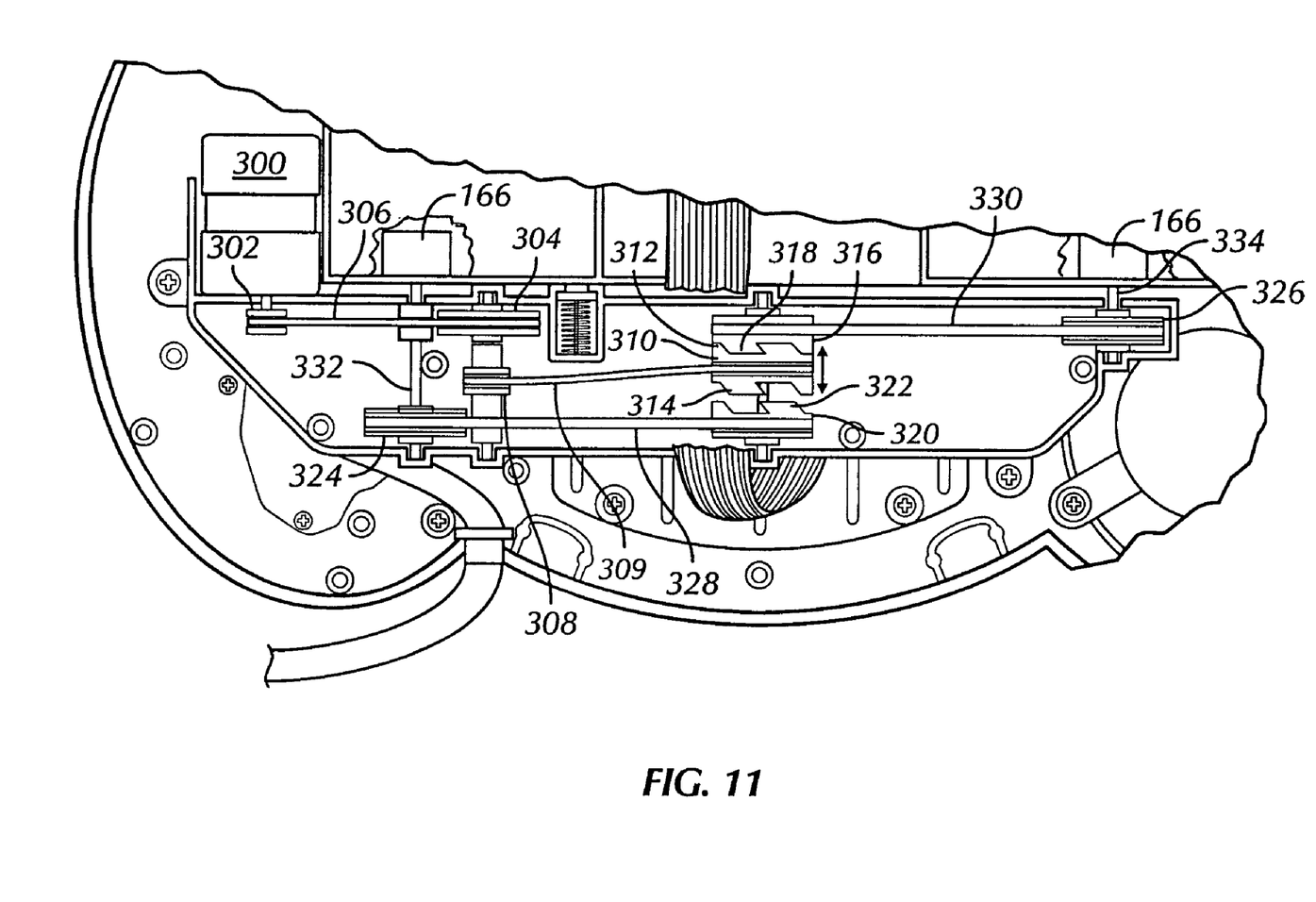
FIG. 11 is a side view of a drive assembly of the interactive device assembly of FIG. 1.

With reference now to FIG. 11, the drive assembly is shown. The drive assembly includes an electric motor 300. The drive motor 300 is preferably reversible. In the preferred embodiment illustrated, the drive motor 300 is operatively coupled to both the first and second rollers 260, 270 via a plurality of pulleys. In particular, a first pulley 310 has a first set of teeth 312 extending in a sloped or canted, generally axial direction on a first side and a second set of teeth 314 extending in an opposing sloped or canted, generally axial direction on a second, opposing side. A second pulley 316 is disposed adjacent the first side of the first pulley, the second pulley 316 having a set of teeth 318 adapted to engage the first pulley first set of teeth 312 in one rotational direction of the first pulley 310. A third pulley 320 is disposed adjacent the second side of the first pulley 310, the third pulley 320 having a set of teeth 322 adapted to engage the first pulley second set of teeth 314 in an opposing rotational direction of the first pulley 310.

The first pulley 310 is coupled to the drive motor 300 via a fourth pulley 302 attached to an output shaft of the motor 300, a fifth pulley 304 and a sixth pulley 308. Fourth pulley 302 drives fifth pulley 304 for rotation via a first belt 306. Sixth pulley 308 is mounted to a common shaft with fifth pulley 304, and rotates with fifth pulley 304. Sixth pulley 308 drives first pulley 310 for rotation via a second belt 309.

First pulley 310 alternatively engages either second pulley 316, when rotating in a first direction, or third pulley 320, when rotating in a second direction. First pulley 310 moves up and down to engage one of the second and third pulleys 316, 320 and disengage the other. When rotated left to right as seen in FIG. 11, second pulley teeth 318 push first pulley 310 downwardly, such that the first pulley second set of teeth 314 drivingly engage third pulley teeth 322. Conversely, when rotating right to left as seen in FIG. 11, the first pulley 310 is pushed upwardly by third pulley 320, such that the first pulley first set of teeth 312 drivingly engage the second pulley teeth 318. The teeth of the first pulley 310 always overlap with teeth from at least one of the second and third pulleys, 316 and 320.

Although pulleys with belts are described, it will be apparent that gear trains, sprockets and chains, and other similar sets of rotary members may be substituted for the pulleys.

Third pulley 320 drives a seventh pulley 324 for rotation via a third belt 328. Seventh pulley 324 is fixedly attached to a shaft 332, onto which one of the drive sockets 166 is fixedly mounted. Similarly, second pulley 316 drives an eighth pulley 326 for rotation via a fourth belt 330. Eighth pulley 326 is fixedly attached to a second shaft 334 onto which a second of the drive sockets 166 is fixedly mounted.

Accordingly, when the drive motor 300 rotates in a first direction, the first drive socket 166 corresponding to moving the scroll 240 in a first direction under tension is rotated, while when the drive motor 300 rotates in a second direction, the second drive socket 166 corresponding to moving the scroll 240 is a second direction under tension is rotated.

With reference now to FIG. 12, the relationship among the electrical and electro-mechanical components of the interactive toy 10 is illustrated in schematic block diagram form. Components housed within the base unit housing 110 of the base unit 100 include a controller 290, along with a plurality of components operatively connected to the controller 290, including: the touchscreen 180; the light array 190; the advance and rewind buttons 122, 124, respectively; the first and second functional buttons 126, 128, respectively; a base unit memory 292; the scroll drive motor 300; the optical sensor 172; and a sound generator 340. The sound generator 340 is operatively coupled to an amplifier 342 and the speaker 130. The microphone 140 is also operatively coupled to the speaker 130. The ROM 284 of the circuit board 280 housed in the cartridge housing 210 of the cartridge 200 is operatively coupled to the controller 290 via the circuit board electrical contacts 282 and the base unit electrical contact pins 168. The base unit memory 292 is housed in the base unit 100 and contains programming, for example to control operation of the optical sensor 172 and generate sound through the sound generator 340. The base unit memory 292 may further contain data to permit interactive operation of the interactive toy 10 without the cartridge 200 inserted therein. It further contains programming to read information stored on the cartridge ROM 284.

As used throughout herein, the cartridge is "inserted" into the cartridge receptacle when the cartridge rollers 260, 270 are operatively engaged with the drive sockets 166 and the drive motor 300 and the cartridge electrical contact(s) 282 (where provided) is operatively engaged with the base unit electrical contact 168.

In operation, a user will insert the cartridge 200 into the base unit 100. The cartridge housing 210 is dimensioned so as to push the cartridge retainers 164 back away from the opening of the cartridge receptacle 160 as the cartridge 200 moves through the opening. As described above, when the cartridge 200 is inserted into the base unit 100, the cartridge retainers 164 are biased into engagement with the locking receptacles to lock the cartridge 200 into the base unit 100. In this locked position, the base unit electrical contact pins 168 operatively engage the circuit board electrical contacts 282, thus allowing digital data to be transferred between the ROM 284 and the controller 290. The release lever engagement pins 174 engage the release lever contacts 266a to pivot the release lever stop pins 266b out of engagement with the scroll release gears 264, 274, allowing the scroll rollers 260, 270 to rotate. Furthermore, as described above, the cartridge drive sockets 166 drivingly engage the scroll sprockets 262, 272 when the cartridge 200 is inserted into the base unit 100, thereby operatively coupling the scroll drive motor 300 to the first and second scroll rollers 260, 270 to control advance and rewind of the scroll 240.

With the cartridge 200 inserted into the base unit 100, the cartridge first window 220 is generally aligned and coextensive with the touchscreen 180 in the base unit window opening. Thus, the image frame 242 displayed and viewable through the first window 220 is also displayed and viewable through the transparent touchscreen 180.

The user proceeds to turn the interactive toy 10 on using the on/off switch 120. In a preferred mode of operation, upon receiving a power on signal with a cartridge 200 in the receptacle 160 or upon receipt of a cartridge 200 in the receptacle 160 after power on, the controller 290 will cause the scroll drive motor 300 to fully rewind the scroll 240 to the initial image frame 242. Further, in a preferred mode of operation, an initial user input received via the touchscreen 180 or the functional buttons 126 and 128 will initiate a signal to the controller 290 to select data from the ROM 284 corresponding to a passage or series of passages, for example a musical passage followed by a spoken passage intended to elicit a response from the user. The data is then transferred to the sound generator 340 from the ROM 284 via the circuit board electrical contacts 282 and the base unit electrical contact pins 168 and the controller 290, which in turn causes the passage to be audibilized via the speaker 130. Illumination of one or more of the lights 192 in the light array 190 may accompany audibilization of the musical passage and/or spoken passage. As the scroll 240 is at least translucent, the first and second windows 220, 222 and touchscreen 180 are transparent, the illuminated lights 192 are visible to the user.

The spoken passage intended to elicit a response from the user might, for example, direct the user to locate a particular icon or image or color displayed on the image frame 242 disposed beneath and visible through the touchscreen 180 and first window 220. If the user then proceeds to apply pressure to the touchscreen 180, a signal is generated by the touchscreen 180 corresponding to the point of deflection of the touchscreen 180 and the signal communicated to the controller 290. The point of deflection is compared to a position corresponding to a correct response to the query. Data corresponding to a response to the user's input is then selected from the ROM 284, the response, for example, being of a laudatory nature if the user's input corresponds to a correct response to the original query. Illumination of at least one of the lights 192 may accompanying the interactive toy's response to the user's input. The controller 290 may then further proceed to cause a second query to be selected and audibilized, to elicit a second response from the user. The interactive play activity may continue at length in a manner as described above.

As an alternative example, the spoken passage intended to elicit a response from the user might direct the user to use the microphone 140 to sing along with a musical passage played subsequent to the spoken passage. The user could then remove the microphone 140 from the microphone mount 118, press the microphone activation button 144, and proceed to use the interactive toy 10 as a "karaoke" device. From this disclosure, the artisan would recognize that in an alternative embodiment, the scroll 240 could have song lyrics disposed thereon as the graphic images 246, and the array of lights 190 could be controlled to illuminate the lyrics in conjunction with lyrics enunciated via the speaker 130.

The user may advance the scroll 240 to the next image frame 242 by activation of the advance button 122, or alternatively activate the rewind button 124 to rewind the scroll 240. The advance button 122 and rewind button 124 operate to control indexing of the scroll among the plurality of image frames 242 by generating signals to the controller 290, which cause the controller 290 to generate signals controlling operation of the scroll drive motor 300. Preferably the controller 290 is configured to advance image frames one at a time for each user activation of button 122, 124, but continuous advance could be used.

Preferably, each individual image frame 242 has graphic images 246 relating to a separate theme, and the queries generated by the interactive toy correspond to the individual image frame 242 and its graphic images 246 then displayed and viewable through the touchscreen 180. Therefore, a large number of queries corresponding to the plurality of image frames 242 is possible. Accordingly, the interactive toy 10 is capable of providing a wide range of play scenarios, enhancing the toy's utility as a play device. From this disclosure, the artisan will recognize that multiple interchangeable cartridges, each directed to a different theme or character, could be provided to further expand the range of play activity possible with the interactive toy device 10.

Activation of the first functional button 126 can cause the controller 290 to generate a speech passage in the form of a query related to at least a portion of the image frame 242 displayed through the touchscreen 180 to be audibilized over the speaker 130. The speech passage prompts a response from the user, preferably prompting the user to provide input to the interactive toy 10 though the touchscreen 180. Alternatively, or in addition, the controller 290 can respond to user touches to the screen to identify objects, icons, etc. underlying the portion of the screen being touched.

Activation of the second functional button 128 preferably causes a musical passage to be audibilized over the speaker 130. Following a pause, a spoken passage, in the form of a query preferably related to the image frame 242 currently displayed and eliciting a response from the user provided via the touchscreen 180, is then also audibilized over the speaker 130.

The base unit 100 is preferably capable of audibilizing sound passages without the cartridge 200 inserted into the cartridge receptacle 160. With the base unit 100 turned on, and the cartridge 100 removed from the cartridge receptacle 160, the controller 290 can be configured to respond to a user pressing on the touchscreen 180 to select data corresponding to a sound passage from the base unit memory 292 and to further audibilize the sound passage via the speaker 130. The sound passage may be, for example, a musical note, a series of musical notes, or a spoken passage. The sound passage may correspond to the position where the user presses on the touchscreen 180 so that the user may compose a series of notes or other sounds to "play" the touchscreen or the sound passage may be a predetermined series of notes of a stored musical composition or other sounds. The latter could be played note by note in response to touches made anywhere on the screen.

From the foregoing it can be seen that the present invention comprises an interactive device particularly well-suited for use as a child's toy. The device includes a base unit adapted to receive a plurality of interchangeable cartridges and provided with a transparent pressure-sensitive touchscreen, functional buttons and a microphone. Each cartridge includes a scroll having a plurality of image frames which are sequentially viewable through the transparent touchscreen. The cartridges include release levers which prevent rotation of the scroll when the cartridge is removed from the base unit, reducing the potential for the scroll to be manipulated and damaged when outside the base unit. The scrolls contain memory storing data which corresponds to images on the scroll organized in an interactive way as described or as a preordered program or presentation. The present invention thus provides an exceptionally versatile, durable and engaging interactive toy.

It will be appreciated by those of ordinary skill in the art that modifications may be made to the above described embodiment without departing from the scope and spirit of the present invention.

We claim:

1. A base unit of an interactive device configured for use with a cartridge including: a cartridge housing; a scroll in the cartridge housing having a first side and a second side, a first end and a second end, and a plurality of image frames disposed on the first side; a first window in the cartridge housing disposed adjacent the first side of the scroll; a first roller rotatably supported within the cartridge housing and connected to the scroll first end; and a second roller rotatably supported within the cartridge housing and connected to the scroll second end, the base unit comprising:
   a base unit housing;
   a cartridge receptacle in the base unit housing adapted to releaseably receive the cartridge;
   a controller;
   at least one drive motor operatively connected to the controller and positioned to be operatively coupled with at least one of the first roller and the second roller of the cartridge with the cartridge inserted into the receptacle; further comprising a first pulley operably coupled with the drive motor and having a first set of teeth that engage teeth of a second pulley, allowing the first pulley to drive the second pulley at least when the first pulley is rotated in a first direction, and a second set of teeth that engage teeth of a third pulley, allowing the first pulley to drive the third pulley at least when the first pulley is rotated in a second direction, wherein the second pulley is operably coupled to the first roller and the third pulley is operably coupled to the second roller;
   at least one scroll index control button operatively coupled with the controller to control operation of the drive motor;
   a window opening through the base unit housing into the receptacle, the window opening being located so as to be in at least general overlying alignment with the first window of the cartridge inserted in the cartridge receptacle, and
   a transparent touchscreen operatively coupled to the controller and positioned in the base unit window opening so as to be in at least general overlying alignment with the first window and the scroll so that the image frames are displayed and visable through both the first cartridge window and the touchscreen.

2. The base unit of claim 1 wherein the touchscreen is adapted to generate a signal to the controller when pressure is applied to the touchscreen, the signal corresponding to a point of application of the pressure.

3. The base unit of claim 1 further comprising at least one electrical contact disposed within the cartridge receptacle and operatively connected to the controller.

4. The base unit of claim 1 further comprising a speech synthesizer operatively coupled with the controller and a speaker operatively coupled with at least one of the speech synthesizer and the controller.

5. The base unit of claim 4 further comprising a base unit electronic memory operatively connected to the controller and containing at least a stored sound passage, wherein the controller selects data corresponding to the sound passage from the base unit electronic memory and audibilizes the sound passage via the speaker at least in response to touches sensed by the touchscreen.

6. The base unit of claim 1 further comprising a speaker supported by the housing and a microphone operatively connected to the speaker.

7. The base unit of claim 1 further comprising a plurality of lights operatively coupled to the controller and disposed in the receptacle, spaced from the base unit window opening sufficiently to receive the cartridge therebetween.

8. The base unit of claim 7 wherein each of the plurality of lights is a light emitting diode.

9. The base unit of claim 7 wherein the plurality of lights are arranged in a two-dimensional array in at least general overlying alignment with the transparent touchscreen.

10. The base unit of claim 1 wherein the at least one drive motor is reversible and electrically-powered.

11. The base unit of claim 10 wherein the drive motor is operatively coupled to both the first and second rollers.

12. The base unit of claim 1 further comprising:
a light source positioned to transmit light into the receptacle; and
a light sensor responsive to light transmitted from the source,
wherein at least the light sensor is operably coupled to the controller.

13. The base unit of claim 12 wherein the light sensor is positioned to receive light from the light source reflected from the scroll of the cartridge inserted in the receptacle.

14. The base unit of claim 1 in combination with the cartridge.

15. The base unit and cartridge combination of claim 14 wherein the cartridge comprises a second window disposed adjacent to the second side of the scroll and the scroll is at least translucent.

16. The base unit and cartridge combination of claim 15 wherein the base unit further comprises an optical sensor operatively coupled to the controller and disposed adjacent to the second window of the cartridge inserted into the cartridge receptacle and wherein the scroll further bears at least one identifier associated with each image frame.

17. The base unit and cartridge combination of claim 16 wherein the optical sensor responds to at least one identifier associated with each image frame to generate a signal passed to the controller to control operation of the drive motor to position each frame in proper alignment with the cartridge first window.

18. The base unit and cartridge combination of claim 16 wherein the optical sensor responds to at least one identifier associated with each image frame to generate a signal passed to the controller identifying the specific image frame associated with each identifier of the plurality of image frames.

19. The base unit and cartridge combination of claim 14 further comprising a plurality of lights operatively coupled to the controller and disposed in the receptacle, spaced from the base unit window opening sufficiently to receive the cartridge therebetween, wherein the plurality of lights are disposed adjacent the second window of the cartridge inserted into the base unit receptacle.

20. The base unit and cartridge combination of claim 19 wherein the plurality of lights when illuminated are visible to a user through the second cartridge window, the scroll, the first cartridge window and the touchscreen.

21. The base unit and cartridge combination of claim 14 further comprising a speech synthesizer operatively coupled with the controller and a speaker operatively coupled with at least one of the speech synthesizer and the controller.

22. The base unit and cartridge combination of claim 21 further comprising a base unit electronic memory operatively connected to the controller, wherein a user pressing on the touchscreen causes the controller to select data corresponding to a sound passage from the base unit electronic memory and to audibilize the sound passage via the speaker.

23. The base unit and cartridge combination of claim 21 wherein the cartridge further comprises:

electronic memory containing data related to the plurality of image frames, and
at least one cartridge electrical contact coupled with the electronic memory and accessible from an exterior of the cartridge housing.

24. The base unit and cartridge combination of claim 23 further comprising a base unit electrical contact operatively engaged with the controller and with the cartridge electrical contact of the cartridge inserted into the cartridge receptacle to allow transfer of the data between the cartridge memory and the controller.

25. The base unit and cartridge combination of claim 24 wherein the base unit further comprises a first functional button operably coupled with the controller to select data corresponding to a sound stored in the cartridge memory and to audibilize the sound via the speaker.

26. The base unit and cartridge combination of claim 25 wherein the sound is a speech passage in the form of a query related to at least a portion of the image frame displayed through both the first cartridge window and the touchscreen, prompting a response from the user.

27. The base unit and cartridge combination of claim 26 wherein the controller is configured to receive a user response to the query via the touchscreen.

28. The base unit and cartridge combination of claim 27 wherein the base unit further comprises a plurality of lights operatively coupled to the controller wherein the user response activates illumination of at least one of the plurality of lights through the controller.

29. The base unit and cartridge combination of claim 28 wherein the user response activates the controller to select data corresponding to at least a second sound from the cartridge memory, and generates the second sound via the speaker.

30. The base unit and cartridge combination of claim 28 wherein the base unit further comprises a second functional button operably coupled with the controller to control generation of at least one musical passage over the speaker.

31. The base unit and cartridge combination of claim 30 wherein illumination of at least one of the lights accompanies playing of the musical passage.

32. A base unit of an interactive device configured for use with a cartridge including: a cartridge housing; a scroll in the cartridge housing having a first side and a second side, a first end and a second end, and a plurality of image frames disposed on the first side; a first window in the cartridge housing disposed adjacent the first side of the scroll; a first roller rotatably supported within the cartridge housing and connected to the scroll first end; and a second roller rotatably supported within the cartridge housing and connected to the scroll second end, the base unit comprising:
a base unit housing;
a cartridge receptacle in the base unit housing adapted to releaseably receive the cartridge;
a controller;
at least one drive motor operatively connected to the controller and positioned to be operatively coupled with at least one of the first roller and the second roller of the cartridge with the cartridge inserted into the receptacle;
a first rotary member operably coupled with the drive motor and having a first set of teeth that engage teeth of a second rotary member, allowing the first rotary member to drive the second rotary member at least when the first rotary member is rotated in a first direction, and a second set of teeth that engage teeth of a third rotary member, allowing the first rotary member to drive the third rotary member at least when the first rotary member is rotated in a second direction, wherein the second rotary member is operably coupled to the first roller and the third rotary member is operably coupled to the second roller;
at least one scroll index control button operatively coupled with the controller to control operation of the drive motor,
a window opening through the base unit housing into the receptacle located so that the window opening is in at least general overlying alignment with the first window and the image frames of the cartridge inserted in the cartridge receptacle so that the image frames are displayed and visible through both the first cartridge window and the base unit window opening; and
a touch responsive array operatively coupled to the controller and positioned in at least general overlying alignment with the base unit window opening and the first window of the cartridge inserted into the cartridge receptacle.

* * * * *